United States Patent
Sharma et al.

(10) Patent No.: US 12,542,798 B2
(45) Date of Patent: Feb. 3, 2026

(54) BUILDING MANAGEMENT SYSTEM WITH SECURITY ASSESSMENT FEATURES

(71) Applicant: Johnson Controls Tyco IP Holdings LLP, Milwaukee, WI (US)

(72) Inventors: Nidhi Sharma, Pune (IN); Yogesh Anil Kokadwar, Pune (IN); Anantharaman Iyer, Pune (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 130 days.

(21) Appl. No.: 18/203,626

(22) Filed: May 30, 2023

(65) Prior Publication Data
US 2023/0388334 A1    Nov. 30, 2023

(30) Foreign Application Priority Data
May 31, 2022   (IN) ............................ 202221031306

(51) Int. Cl.
*H04L 9/40*     (2022.01)

(52) U.S. Cl.
CPC ...... *H04L 63/1433* (2013.01); *H04L 63/1416* (2013.01); *H04L 63/1425* (2013.01)

(58) Field of Classification Search
CPC ............. H04L 63/1433; H04L 63/1416; H04L 63/1425
See application file for complete search history.

(56) References Cited

U.S. PATENT DOCUMENTS

| | | | |
|---|---|---|---|
| 6,414,969 B1 | 7/2002 | Herring | |
| 6,973,067 B1 | 12/2005 | Haartsen | |
| 7,406,299 B1 | 7/2008 | Hudson | |
| 8,898,526 B1 | 11/2014 | Noujeim | |
| 10,313,211 B1 * | 6/2019 | Rastogi | ................. H04L 43/065 |
| 10,419,450 B2 | 9/2019 | Muddu et al. | |
| 10,819,721 B1 * | 10/2020 | Jenkins | ............... H04L 63/0236 |
| 11,598,544 B1 * | 3/2023 | Schubert | ........... G05D 23/1917 |
| 2003/0065409 A1 | 4/2003 | Raeth et al. | |

(Continued)

OTHER PUBLICATIONS

US Final Office Action on U.S. Appl. No. 17/204,381 dated Apr. 24, 2023 (28 pages).

(Continued)

*Primary Examiner* — Mohamed A. Wasel
(74) *Attorney, Agent, or Firm* — Foley & Lardner LLP

(57) ABSTRACT

The present disclosure relates to a building management system (BMS) configured to communicate with a target system comprising a plurality of target devices to identify information pertaining to parameters of the plurality of target devices, analyze the information based on data feeds to identify a threat associated with at least one of the parameters, perform at least one test operation on the information to obtain test data, determine at least one of network traffic of at least one of the plurality of target devices, one or more firmware components of at least one of the plurality of target devices, or a configuration deployed on at least one of the plurality of target devices and determine a system cyber health score of the target system based on device cyber health scores for the plurality of target devices, wherein the system cyber health score is based on the least one of the test data, network traffic, threat, firmware components, or configuration.

20 Claims, 8 Drawing Sheets

(56) References Cited

U.S. PATENT DOCUMENTS

| | | |
|---|---|---|
| 2004/0123143 A1 | 6/2004 | Katz |
| 2006/0129679 A1 | 6/2006 | Hlasny |
| 2006/0161691 A1 | 7/2006 | Katibian et al. |
| 2007/0112545 A1 | 5/2007 | Barford |
| 2008/0313698 A1 | 12/2008 | Zhao |
| 2011/0071685 A1 | 3/2011 | Huneycutt et al. |
| 2012/0259583 A1 | 10/2012 | Noboa et al. |
| 2013/0014226 A1 | 1/2013 | Larson et al. |
| 2013/0204439 A1 | 8/2013 | Scelzi |
| 2014/0316584 A1 | 10/2014 | Matsuoka et al. |
| 2015/0063114 A1 | 3/2015 | Praveenkumar et al. |
| 2015/0229661 A1* | 8/2015 | Balabine ............ H04L 63/1425 726/22 |
| 2017/0006135 A1 | 1/2017 | Siebel |
| 2017/0346851 A1 | 11/2017 | Drake |
| 2018/0102954 A1 | 4/2018 | Schubert et al. |
| 2018/0102958 A1 | 4/2018 | Guthrie et al. |
| 2018/0131408 A1 | 5/2018 | Austad |
| 2018/0253569 A1 | 9/2018 | Swierk et al. |
| 2018/0268304 A1 | 9/2018 | Manadhata et al. |
| 2019/0215688 A1 | 7/2019 | Zavesky |
| 2019/0238584 A1 | 8/2019 | Somasundaram et al. |
| 2020/0081870 A1 | 3/2020 | Mccoy et al. |
| 2020/0162354 A1* | 5/2020 | Drees .................... G06N 3/088 |
| 2020/0396244 A1 | 12/2020 | Paturi et al. |
| 2021/0233388 A1 | 7/2021 | Martin et al. |
| 2021/0294317 A1 | 9/2021 | Sharma et al. |
| 2021/0351882 A1 | 11/2021 | Ayadurai et al. |
| 2022/0058556 A1* | 2/2022 | Warake ............. G06Q 10/0639 |
| 2022/0225406 A1 | 7/2022 | Kim et al. |
| 2022/0400135 A1* | 12/2022 | Gamra .................. H04L 63/20 |
| 2023/0055822 A1* | 2/2023 | Amir ...................... H04L 67/12 |

OTHER PUBLICATIONS

US Non-Final Office Action on U.S. Appl. No. 17/204,381 dated Sep. 16, 2022 (24 pages).

* cited by examiner

BUILDING MANAGEMENT SYSTEM WITH SECURITY ASSESSMENT FEATURES

CROSS-REFERENCE TO RELATED PATENT APPLICATIONS

The present application claims priority to and the benefit of Indian Provisional Application No. 20221031306, filed May 31, 2022, which is incorporated herein by reference in its entirety.

BACKGROUND

The present disclosure relates generally to building management systems. Particularly, the present disclosure relates to security assessment of building management systems.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

Buildings are becoming increasingly intelligent day by day because of improved processing capabilities of BMS by employing IoT-enabled devices. However, by employing IoT-enabled devices, BMSs are also exposed to cyberattacks. BMS devices are generally installed in locations that are not easily accessible, thereby making it difficult to perform testing and evaluate cyber health of such devices once they are deployed on field. Moreover, such devices support multiple protocols. Thus, cyber health assessment and vulnerability detection or prevention is challenging because of the ambiguity and wide range of protocols that need to be supported. BMS devices are vulnerable to cyber-attacks that may go unnoticed, and the prevention measures can be ensured only during the time of development. Also, if a security breach happens at one site of a building environment, other sites with similar setup are also vulnerable to the security breach.

In today's building automation ecosystem, IT infrastructure and OT (Operational Technologies)/IoT-enabled devices coexist in the same premise physically but OT components are not mapped or called out clearly in the IT infrastructure. Further, although BMSs are multi-tier architecture systems and they communicate with each other for managing the building efficiently, they continue to exist in isolation. The IT infrastructure does not have visibility to OT infrastructure and many a times, any kind of attacks on the BMS devices go unnoticed. In existing systems, cybersecurity is generally validated during penetration testing of the product. Software threats can be mitigated at any stage, but managing and mitigating threats that require hardware changes is costly and time consuming. Additionally, the BMS devices do not have sophisticated detection mechanisms in place which make them soft target for attackers to attack the building infrastructure or can often be used as pivot systems in large scale attacks.

There is, therefore, felt a need to provide a Building Management System that alleviates the aforementioned drawbacks by performing proactive security assessment of building devices by determining cyber health of building devices.

SUMMARY

One implementation of the present disclosure relates to a building management system (BMS) including one or more processors and one or more non-transitory computer-readable media storing instructions that, when executed by the one or more process, cause the one or more processors to perform operations. The operations include communicating with a target system comprising a plurality of target devices to identify information pertaining to parameters of the plurality of target devices, analyzing the information based on data feeds to identify a threat associated with at least one of the parameters, performing at least one test operation on the information to obtain test data, determining at least one of network traffic of at least one of the plurality of target devices, one or more firmware components of at least one of the plurality of target devices, or a configuration deployed on at least one of the plurality of target devices and determining a system cyber health score of the target system based on device cyber health scores for the plurality of target devices, wherein the system cyber health score is based on the least one of the test data, network traffic, threat, firmware components, or configuration.

Another implementation of the present disclosure relates to a building management system (BMS) including a memory configured to store a plurality of parameters. The BMS further includes a processing circuit to communicate with a target device to identify information pertaining to the parameters and communicate with one or more servers to obtain data feeds. The information pertaining to one or more parameters may be analyzed based on the data feeds to identify a threat associated with one or more parameters. Further, the processing circuit may perform at least one test operation on the information pertaining to one or more parameters to obtain test data. The processing circuit may determine network traffic of the target device. The processing circuit may further determine one or more firmware components of the target device and configuration deployed on the target device. Further, the processing circuit may determine cyber health score of the target device based on at least one of the test data, network traffic, threat, firmware components and configuration.

Yet another implementation of the present disclosure relates to a building management system (BMS) including a processing circuit that may generate a layout of a circuit board, the layout having one or more components of the circuit board. The processing circuit may further communicate with one or more servers to obtain data feeds corresponding to one or more components of the circuit board and determine cyber health score of the one or more components by analyzing the layout based on the data feeds.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Before turning to the Figures, it should be understood that the disclosure is not limited to the details or methodology set forth in the description or illustrated in the figures. It should also be understood that the terminology is for the purpose of description only and should not be regarded as limiting.

Referring generally to the Figures, a controller is shown and described that addresses the shortcomings of conventional systems. The controller may be utilized in conjunction with a plurality of building automation or management systems, subsystems, or as a part high level building automation system. For example, the controller may be a part of a Johnson Controls Facility Explorer system.

Figure 1:
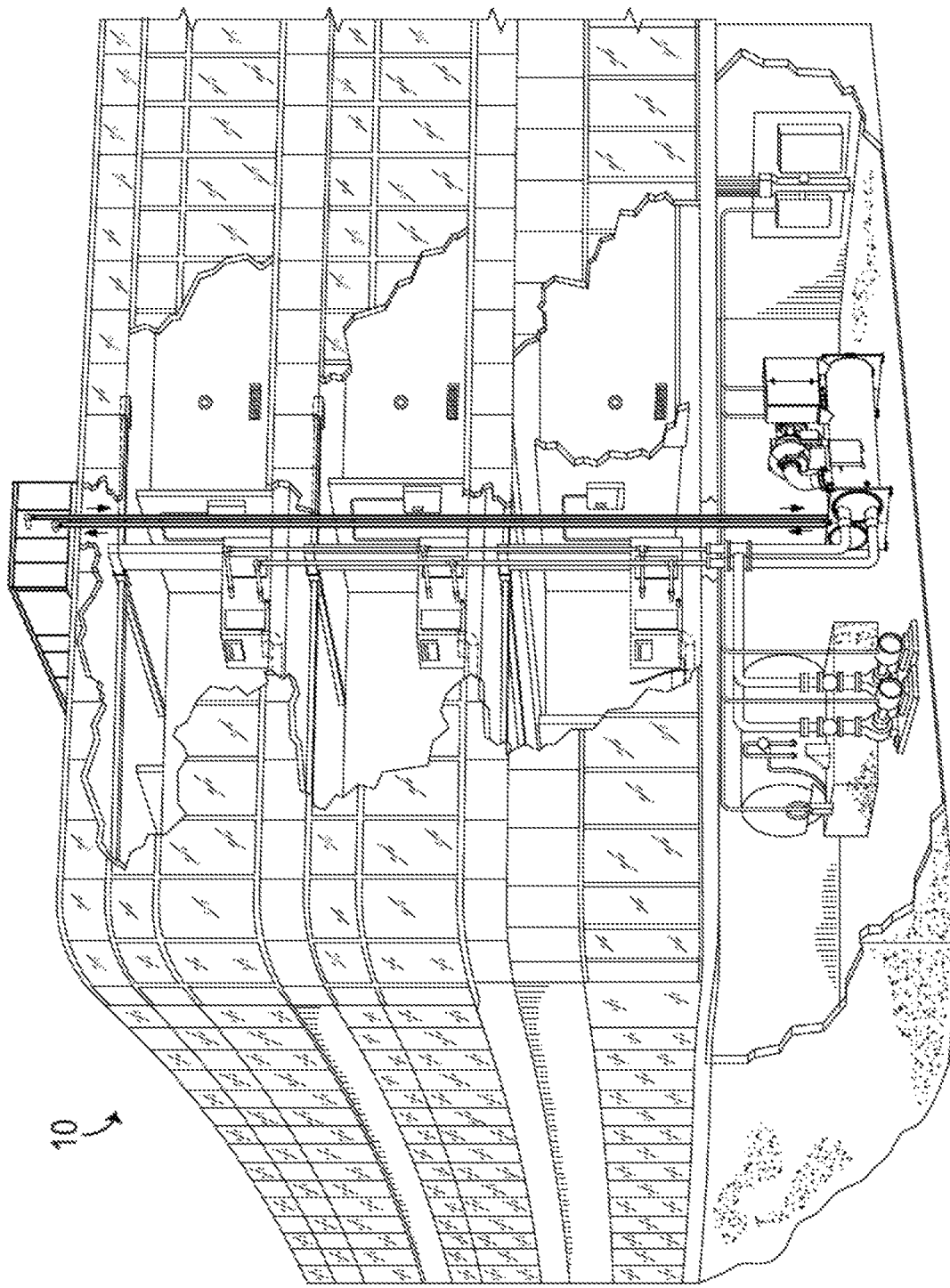
FIG. 1 is a drawing of a building equipped with a building management system (BMS), according to some embodiments.

Referring now to FIG. 1, a perspective view of a building 10 is shown, according to an exemplary embodiment. A BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

Figure 2:
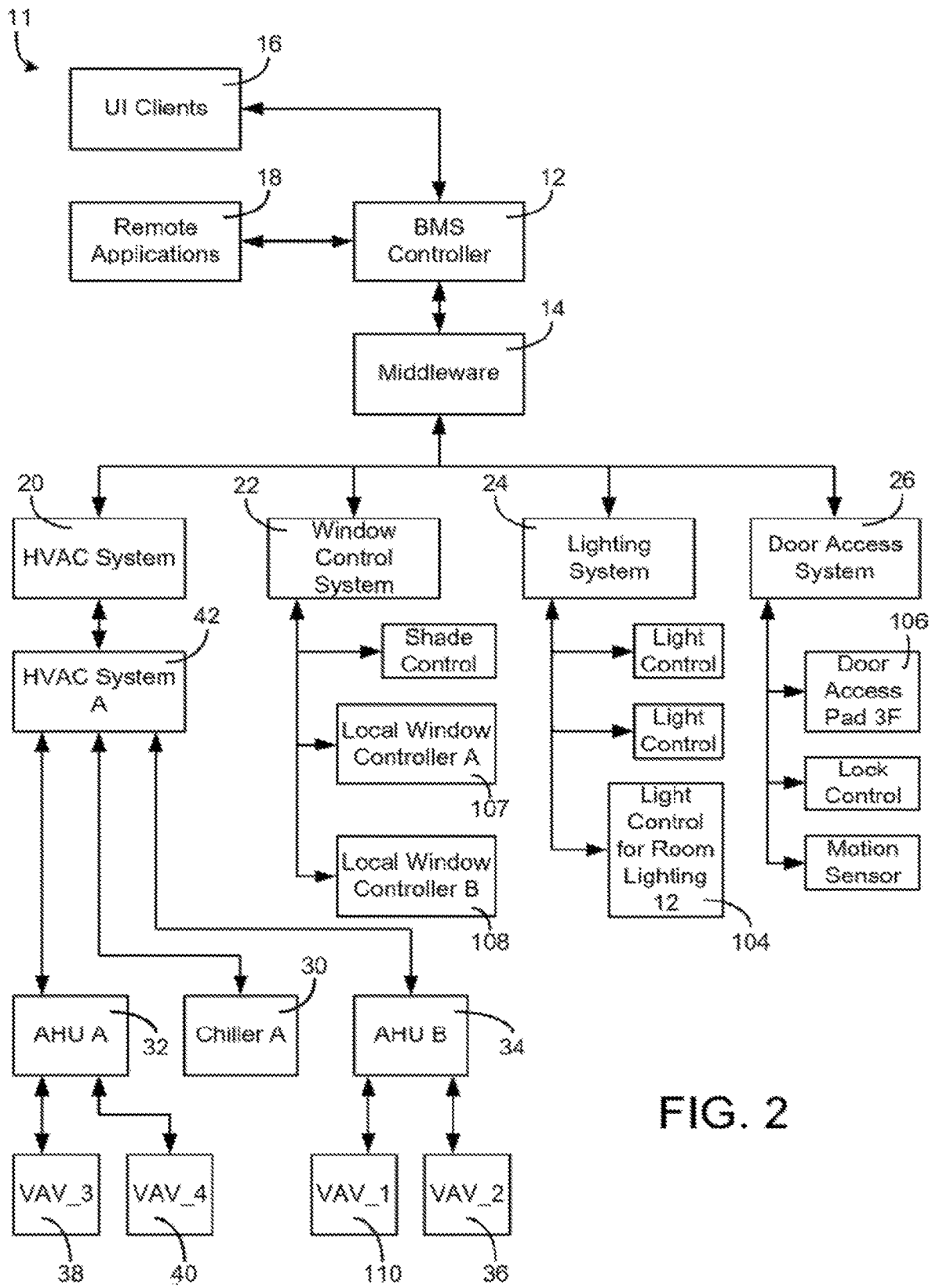
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU (air handling unit) 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
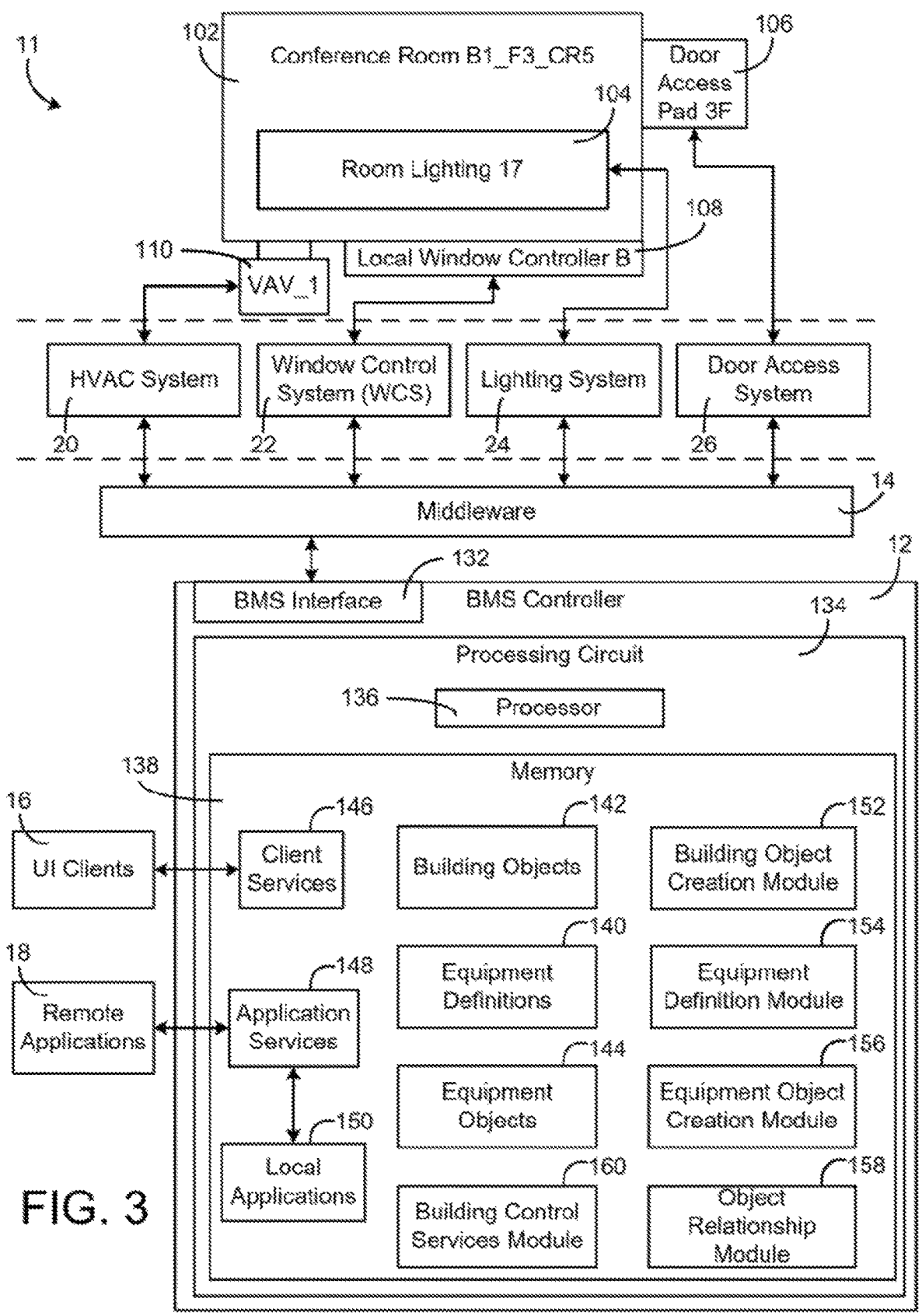
FIG. 3 is a block diagram of a BMS controller which can be used in the BMS of FIG. 2, according to some embodiments.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, an NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a graphical user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20.DPR-POS" (i.e., the damper position of VMA-20) and/or "VMA-20.SUP-FLOW" (i.e., the supply air flow rate through VMA-Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA-20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-SUP-FLOW." Advantageously, the abstracted text string matches other equipment-specific data points corresponding to the supply air flow rates of other BMS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18.SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
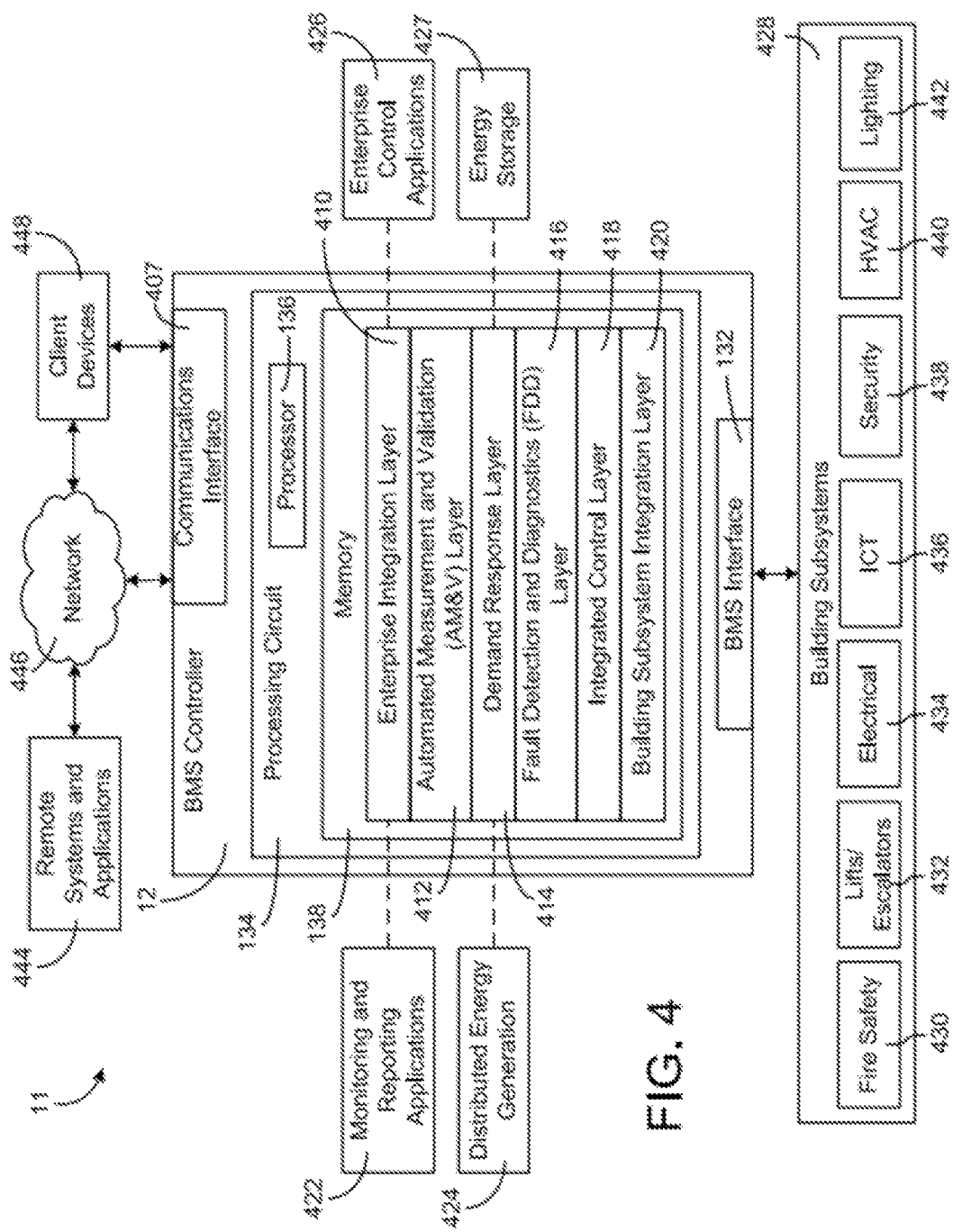
FIG. 4 is another block diagram of the BMS that serves the building of FIG. 1, according to some embodiments.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as HVAC system 20, as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In one embodiment, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428.

Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System with Security Assessment Features

Figure 5:
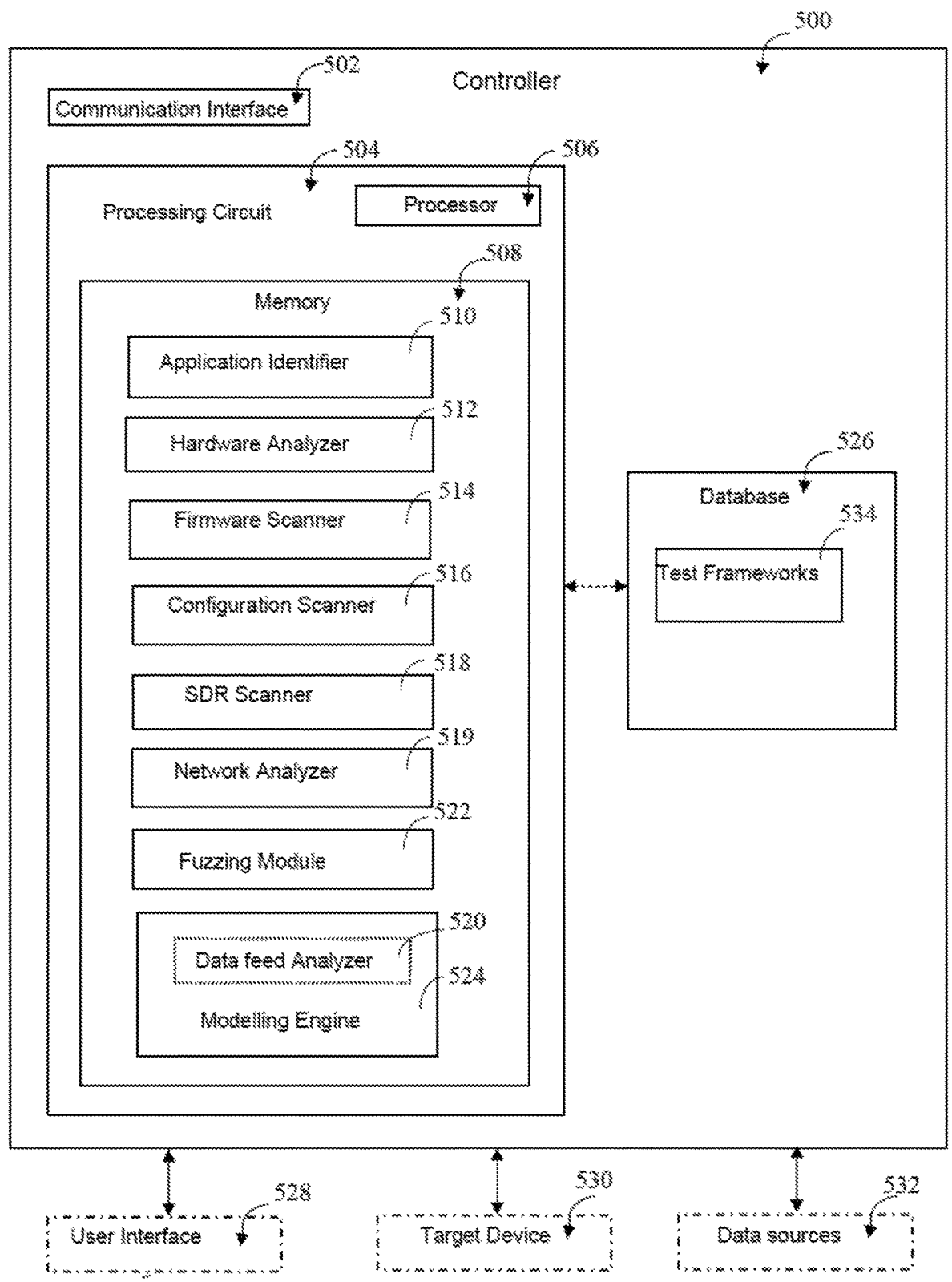
FIG. 5 is a block diagram of a controller that can be used in the BMS, according to some embodiments.

Referring now to FIG. 5, a block diagram illustrating a controller 500 is shown, according to some embodiments. Controller 500 can be a controller of the building management systems (BMS) described above with respect to FIGS. 1-4. Controller 500 is shown to include a communication interface 502, a processing circuit 504 and a database 526. Communication interface 502 may include wired or wireless interfaces (e.g., jacks, antennas, transmitters, receivers, transceivers, wire terminals, etc.) for conducting data communications with various systems, devices, or networks. For example, communication interface 502 may include an Ethernet card and port for sending and receiving data via an Ethernet-based communications network and/or a Wi-Fi transceiver for communicating via a wireless communications network. Communication interface 502 may be configured to communicate via local area networks or wide area networks (e.g., the Internet, a building WAN, etc.) and may use a variety of communication protocols (e.g., BACnet, IP, LON, etc.).

Communication interface 502 may be a network interface configured to facilitate electronic data transfer between the controller 500 and various external systems or devices (e.g., one or more user interfaces 528). In some embodiments, the communication interface 502 can be the communication interface of the building management systems (BMS) described above with respect to FIGS. 1-4.

The processing circuit 504 is shown to include a processor 506 and a memory 508. In some embodiments, the processing circuit 504 can be the processing circuit of the building management systems (BMS) described above with respect to FIGS. 1-4. The processor 506 may be a general purpose or specific purpose processor, an application specific integrated circuit (ASIC), one or more field programmable gate arrays (FPGAs), a group of processing components, or other suitable processing components. The processor 506 may be configured to execute computer code or instructions stored in memory 508 or received from other computer readable media (e.g., CDROM, network storage, a remote server, etc.).

The memory 508 may include one or more devices (e.g., memory units, memory devices, storage devices, etc.) for storing data and/or computer code for completing and/or facilitating the various processes described in the present disclosure. The memory 508 may include random access memory (RAM), read-only memory (ROM), hard drive storage, temporary storage, non-volatile memory, flash memory, optical memory, or any other suitable memory for storing software objects and/or computer instructions. The memory 508 may include database components, object code components, script components, or any other type of information structure for supporting various activities and information structures described in the present disclosure. The memory 508 may be communicably connected to the processor 506 via the processing circuit 504 and may include computer code for executing (e.g., by processor 506) one or more processes described herein.

Still referring to FIG. 5, the controller 500 is shown to be in communication with the user interface 528, typically, via the communication interface 502. In some embodiments, the user interface 528 may be associated with an electronic device of a user. In some embodiments, the electronic device can be one of, but not limited to, mobile, smartphone, laptop, desktop, personal digital assistant (PDA), tablet, or any other electronic device with communication capabilities.

Still referring to FIG. 5, the controller 500 is shown to include a database 526. In some embodiments, the database 526 may be located remote from the controller 500. The database 526 is shown to include one or more predefined test frameworks 534.

As shown, the controller 500 is in communication with the one or more data sources 532, alternatively referred as servers. In some embodiments, the data sources 532 may be one or more of third-party data sources, remote data sources, and on-premises data sources. For an example, the data sources 532 may include one or more remote data sources that may correspond to remote servers associated with open-source networks. In some embodiments, the controller 500 may be configured to obtain a plurality of data feeds from the data sources 532 that may be further stored in the database 526. In some embodiments, the data feeds may include threat information associated with a plurality of parameters of building devices. Further, in some embodiments, the database 526 may be populated with a plurality of data seeds indicating an initial set of data that provide threat information associated with a plurality of parameters of building devices.

Still referring to FIG. 5, the controller 500 is shown to be in communication with the one or more target devices 530 via the communication interface 502. The target device(s) 530 may be one of the IoT enabled devices, i.e., edge devices of the BMS. In some embodiments, the target device(s) 530 may be one of the building subsystems 428 present in a BMS as disclosed in FIGS. 1-4. For example, the target device(s)

530 may be the security subsystem 438 of BMS 11, and include each device within the security subsystem 438. In some other embodiments, the target device(s) 530 is adapted to be connected with one or more peripheral devices such as the building subsystems 428. In some embodiments the target device(s) 530 may be an entire building or building management system, such as for example BMS 11, including the subsystems and devices therein.

Generally, building devices such as target device(s) 530 often support a wide range of communication protocols. The controller 500 is facilitated to communicate with the target device(s) 530 via the communication interface 502 using one or more of a plurality of communication protocols. The plurality of communication protocols may be selected from a group consisting of, but not limited to, BACnet, Modbus, MQTT (Message Queueing Telemetry Transport), Lora WAN, Zigbee, Z-wave, UART (Universal Asynchronous Receiver-Transmitter), JTAG (Joint Test Action Group), SPI (Serial Peripheral Interface), I2C (Inter-Integrated Circuit) etc. In some embodiments, when the target device(s) 530 is a group of target devices such as a building subsystem, the controller 500 may use communication interface 502 to communicate across the plurality of communication protocols used within the subsystem.

Further, in some embodiments, the memory 508 may be configured to store a plurality of parameters. The plurality of parameters may be selected from a group consisting of, but not limited to, hardware ports, communication protocols, software-defined radio components, firmware components, third-party libraries, applications, configuration etc. In some embodiments, the plurality of parameters are each associated with the target device(s) 530. In some embodiments, such as when the target device(s) 530 is a group of target devices such as a building subsystem, the plurality of parameters may relate to one or more different devices within the group of target devices 530. For example, one parameter stored in memory 508 can relate to a first target device in the target device(s) 530 when the target device(s) 530 is the fire safety subsystem 430, and another parameter stored in memory 508 can related to a different device in the target device(s) 530 in the fire safety subsystem 420.

Still referring to FIG. 5, the controller 500 may communicate with the target device(s) 530 to identify information pertaining to one or more of the parameters. The controller 500 is shown to include an application identifier 510. The application identifier 510 may be configured to identify information pertaining to one or more parameters such as one or more applications including application software details, current software version information, third-party libraries/shared libraries, operating system etc., deployed on the target device(s) 530. For example, the application identifier 510 may identify information pertaining to an operating system (OS) such as Windows, Linux etc. deployed on the target device(s) 530. In some embodiments, the application identifier 510 may also determine if one or more applications deployed on the target device(s) 530 are containerized. In some embodiments, the application identifier 510 may identify one or more applications on multiple devices when the target device(s) 530 is a group of target devices.

Still referring to FIG. 5, the controller 500 is shown to include a hardware analyzer 512. The hardware analyzer 512 may be configured to identify information pertaining to one or more parameters such as hardware ports of target device(s) 530, a layout of target device(s) 530, or communication protocols of the target device(s) 530. As referred above, the plurality of communication protocols may be selected from a group consisting of, but not limited, BACnet, Modbus, MQTT (Message Queueing Telemetry Transport), Lora WAN, Zigbee, Z-wave, UART (Universal Asynchronous Receiver-Transmitter), JTAG (Joint Test Action Group), SPI (Serial Peripheral Interface), I2C (Inter-Integrated Circuit), and the like. The hardware analyzer 512 may scan one or more hardware ports and communication protocols of the target device(s) 530. For example, the hardware analyzer 512 may determine if the target device(s) 530 is connected through an IO port, a universal adaptor or directly to the controller 500.

Still referring to FIG. 5, the controller 500 is shown to include a firmware scanner 514. The firmware scanner 514 may be configured to identify information pertaining to one or more parameters such as firmware components (e.g., firmware binaries) associated with the target device(s) 530. The information may provide insights into firmware image and third-party binaries associated with the target device(s) 530.

Still referring to FIG. 5, the controller 500 is shown to include a configuration scanner 516. The configuration scanner 516 may be configured to identify information pertaining to one or more parameters such as configuration deployed on the target device(s) 530. In some embodiments, the configuration may indicate at least one of a device configuration i.e., internal configuration within the target device(s) 530 or tier 2/tier 3 configuration of one or more devices connected with the target device(s) 530.

Still referring to FIG. 5, the controller 500 is shown to include an SDR (Software-defined radio) scanner 518. The SDR scanner 518 may be configured to identify information related to one or more parameters such as one or more software components, alternatively referred as SDR components of the target device(s) 530. The SDR scanner 518 may be configured to identify one or more radio frequencies supported by the target device(s) 530. For example, the SDR scanner 518 may determine if the target device(s) 530 supports Bluetooth, Zigbee or any other radio frequencies.

Still referring to FIG. 5, the controller 500 is shown to include a network analyzer 519. The network analyzer 519 may be configured to monitor network traffic of the target device(s) 530. The network traffic may indicate incoming and/or outgoing traffic in a network pertaining to the target device(s) 530. For example, network traffic may indicate traffic or data packets generated or transmitted by the target device(s) 530 over the network. Additionally, network traffic may indicate data packets received by the target device(s) 530 from one or more external entities in the network.

Still referring to FIG. 5, the controller 500 is shown to include a data feed analyzer 520. In some embodiments, the data feed analyzer 520 may be a part of a modelling engine 524. Alternatively, in some other embodiments, the data feed analyzer 520 may be external to the modelling engine 524 and perform one or more tasks independently. The data feed analyzer 520 may be configured to analyze the information pertaining to one or more parameters based on the data feeds to identify a threat associated with the one or more parameters. As referred above, the controller 500 may communicate with one or more servers such as the data sources 532 to obtain the data feeds. In some embodiments, the data feeds may be provided by a prediction engine (not shown) stored remotely on a cloud. Prediction engine is described in greater detail in U.S. patent application Ser. No. 20210294317 filed Mar. 17, 2021, the entirety of which is incorporated by reference herein.

The data feed analyzer 520 may be configured to analyze information pertaining to one or more parameters including, but not limited to, applications such as operating system, third-party libraries/shared libraries, firmware components etc. based on the data feeds. As referred above, the data feeds may include threat information associated with the plurality of parameters. The data feed analyzer 520 may utilize artificial intelligence and machine learning techniques to analyze the information pertaining to the one or more parameters based on the data feeds to identify a threat associated with the one or more parameters of the target device(s) 530 (or target devices 530). In some other embodiments, the information pertaining to one or more parameters may be analyzed based on the data seeds stored in the database 526 to identify a threat associated with the one or more parameters.

Still referring to FIG. 5, the controller 500 is shown to include a fuzzing module 522. The fuzzing module 522 may be configured to perform at least one test operation on information pertaining to one or more parameters to obtain test data. In some embodiments, the fuzzing module 522 may be configured to perform at least one test operation on information pertaining to one or more parameters such as, but not limited to, hardware ports, communication protocols, software-defined radio components, applications deployed on the target device(s) 530 etc. In some embodiments, the test operation may indicate one or more fuzzing operations that involve providing one or more invalid, random, or unexpected inputs into the target device(s) 530 to obtain test data. In some embodiments, the fuzzing module 522 may be configured to utilize one or more predefined test frameworks 534 stored in the database 526 to perform the test operation. The one or more predefined test frameworks 534 may be a set of guidelines or rules used for creating and performing the test operation. In some other embodiments, the fuzzing module 522 may be configured to generate one or more test frameworks on-the-fly based on the information pertaining to the one or more parameters of the target device(s) 530. Further, the fuzzing module 522 may perform the at least one test operation and provide an outcome of the test operation in the form of test data.

Still referring to FIG. 5, the controller 500 is shown to include the modelling engine 524. In some embodiments, the modelling engine 524 may communicate with the data feed analyzer 520 to obtain details on the threat associated with the one or more parameters. Alternatively, in other embodiments, the data feed analyzer 520 may be a part of the modelling engine 524, such that the modelling engine 524 may be configured to directly identify the threat associated with the one or more parameters by analyzing the information pertaining to one or more parameters based on the data feeds.

Further, the modelling engine 524 may be configured to communicate with the fuzzing module 522 to receive the test data. The modelling engine 524 may also communicate with the network analyzer 519 to receive details on the network traffic of the target device(s) 530. Further, the modelling engine 524 may communicate with the firmware scanner 514 to receive details on the firmware components of the target device(s) 530. Additionally, the modelling engine 524 may communicate with the configuration scanner 516 to receive details on the configuration deployed on the target device(s) 530. In other words, at least one of the test data, network traffic, threat, firmware components, and configuration may be fed as one or more inputs to the modelling engine 524. The modelling engine 524 may further determine cyber health score of the one or more target devices 530 based on analyzing at least one of the information, the plurality of parameters, the test data, network traffic, threat, firmware components, and configuration. The modelling engine 524 may utilize artificial intelligence techniques such as machine learning, deep learning etc., to analyze at least one of the information, the plurality of parameters, the test data, network traffic, threat, firmware components, and configuration to determine a cyber health score of the target device(s) 530. The cyber health score may provide an indication of a probability of cyber-attacks that the target device(s) 530 may be subjected to. In embodiments with one or more target devices 530, such as when the target device(s) 530 is a building subsystem, the modeling engine 524 may be configured to determine a cyber health score for each target device(s) 530. In such embodiments, the modeling engine 524 may additionally and/or alternatively be configured to generate an aggregate or system-level cyber health score for the target device(s) 530, (e.g., the fire safety subsystem 430, the security subsystem 438, etc.) based on cyber health scores for each device within the group of target device(s) 530. In some embodiments, the system cyber health score is based on an average of the cyber health scores of the target devices 530. In some embodiments, the system cyber health score correlates or is based on a minimum cyber health score in the plurality of cyber health scores for the target devices 530. In some embodiments, it is based on the maximum.

In some embodiments, the modelling engine 524 may assign weightage to each of the test data, network traffic, threat, firmware components, and configuration to determine the cyber health score. For example, if the target device(s) 530 is not connected to the network i.e., the target device(s) 530 is offline, then the modelling engine 524 may assign a low weightage to the network traffic while determining the cyber health score, since the incoming/outgoing network traffic pertaining to the target device(s) 530 is null.

In some embodiments, the modeling engine 524 may assign weightage to each of the target devices 530 in a group of target devices 530. For example, a BMS controller such as BMS controller 12 may be assigned more weight than a window control system controller such as WCS 22. In some embodiments, the assigned weights are based on a predefined weighting of devices in a group of target devices 530. In some embodiments, the assigned weighting is based on an amount of information collected pertaining to the parameters of the target devices 530. For example, a target device(s) 530 with known network traffic, a known configuration, and known firmware components may be assigned a higher weight than a target device(s) 530 with only a known configuration. In some embodiments, the weights are assigned based on a severity of a threat corresponding to a parameter of a target device(s) 530. In some embodiments, the weights are assigned based on a position within a device tree binary of a system of target devices 530.

In some other embodiments, one or more outputs from each of the application identifier 510, hardware analyzer 512, firmware scanner 514, configuration scanner 516, SDR scanner 518, network analyzer 519, data feed analyzer 520, and fuzzing module 522 may be fed as inputs to the modelling engine 524 in order to determine the cyber health score or scores of the target device(s) 530. In other words, the modelling engine 524 may directly communicate with each of application identifier 510, hardware analyzer 512, firmware scanner 514, configuration scanner 516, SDR scanner 518, network analyzer 519, data feed analyzer 520, and fuzzing module 522 to determine the cyber health scores using artificial intelligence techniques.

In some embodiments, the modelling engine 524 may provide one or more alerts to the user interface 528, indicating the cyber health score of the target device(s) 530. For example, the modelling engine 524 may compare the cyber health score with a predefined threshold and generate one or more alerts on the user interface 528 based on a deviation of the cyber health score from the predefined threshold. The alerts in form of audio, visual, textual based alerts, or any combination thereof may be provided to a user via the user interface 528. In some embodiments, the predefined threshold may be set by the controller 500. In some other embodiments, the predefined threshold may be set by a user via the user interface 528.

In some cases, the information pertaining to the plurality of parameters of the target device(s) 530 being transmitted to the controller 500 may lead to privacy issues at a customer site. To avoid such issues, the processing circuit 504 can be deployed on the target device(s) 530 to compute the cyber health score of the target device(s) 530 locally, thereby eliminating the need of transmitting the information from the target device(s) 530 to any remote site such as the controller 500.

In some embodiments, a thin agent (not shown) may be present on the controller 500 which can connect securely to the prediction engine stored remotely on a cloud. The information received from each of the application identifier 510, hardware analyzer 512, firmware scanner 514, configuration scanner 516, SDR scanner 518, network analyzer 519, data feed analyzer 520, fuzzing module 522, and the modelling engine 524 can be fed to the prediction engine for validating the cyber health score for the target device(s) 530.

Figure 6:
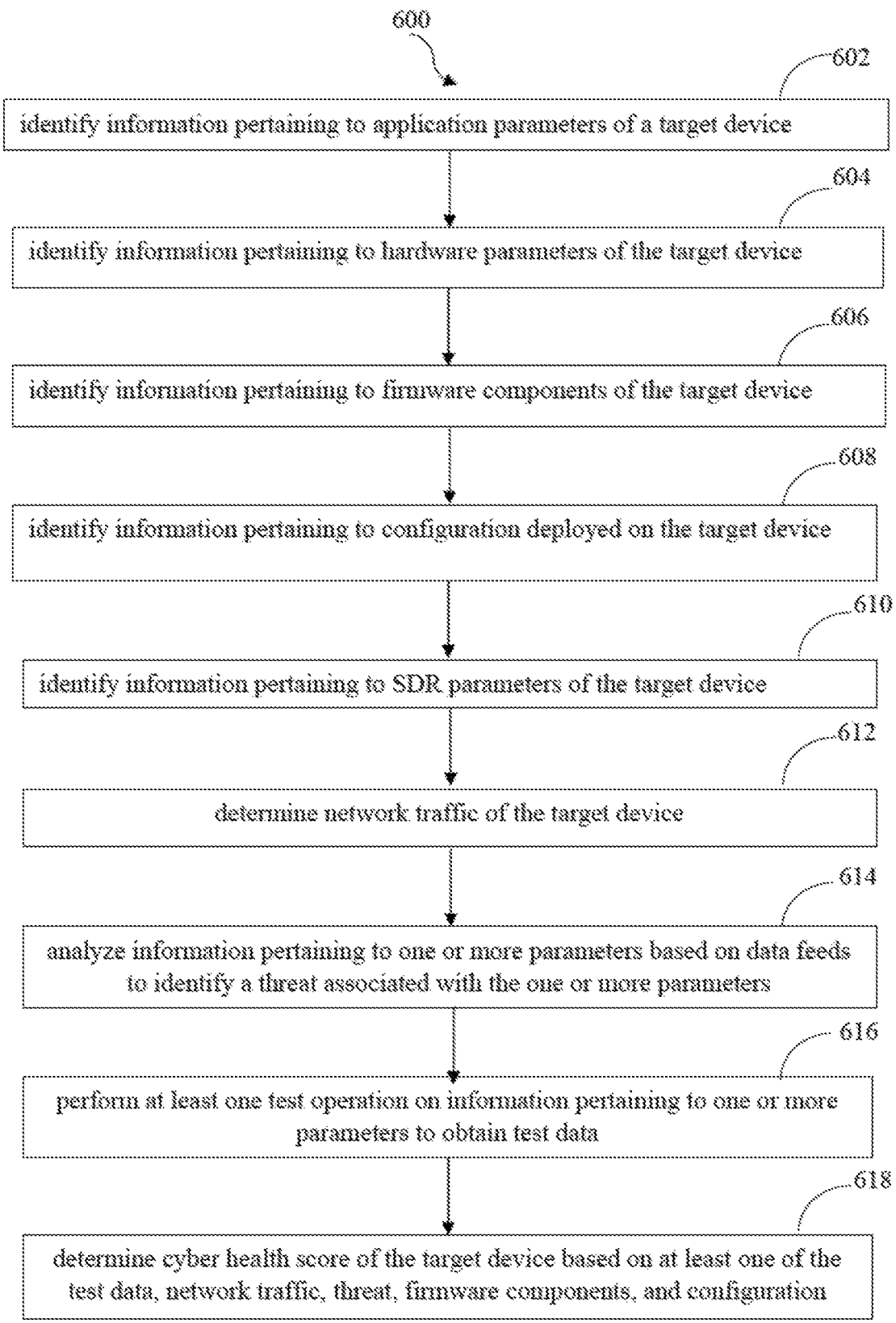
FIG. 6 is a flowchart of a method for determining cyber health score of a target device, according to some embodiments.

Referring now to FIG. 6, a flow chart of a method 600 for determining cyber health score of a target device is shown, according to some embodiments. The method 600 is performed by the controller 500 referred above in FIG. 5. Alternatively, the method 600 may be partially or completely performed by another computing system or controller of the BMS.

The method 600 is shown to include a step of identifying information pertaining to one or more parameters such as one or more applications including application software details, current software version information, third-party libraries/shared libraries, operating system deployed on the target device(s) 530 etc. (Step 602). In some embodiments, the target device is a group of target devices, such as a system or subsystem in a BMS (e.g., security subsystem 438). In some embodiments, the information may be identified by the application identifier 510 (referred above in FIG. 5). For example, the application identifier 510 may identify information pertaining to an operating system (OS) such as Windows, Linux etc., deployed on the target device(s) 530. In some embodiments, the application identifier 510 may also determine if one or more applications deployed on the target device(s) 530 are containerized.

The method 600 is further shown to include a step of identifying information pertaining to one or more parameters such as hardware ports of target device(s) 530, communication protocols used on the target device(s) 530 etc. (Step 604). In some embodiments, the information may be identified by the hardware analyzer 512 (referred above in FIG. 5). As referred above, the plurality of communication protocols may be selected from a group consisting of, but not limited, BACnet, Modbus, MQTT (Message Queueing Telemetry Transport), Lora WAN, Zigbee, Z-wave, UART (Universal Asynchronous Receiver-Transmitter), JTAG (Joint Test Action Group), SPI (Serial Peripheral Interface), I2C (Inter-Integrated Circuit), and the like. The hardware ports and communication protocols of the target device(s) 530 may be scanned by the hardware analyzer 512. For example, the hardware analyzer 512 may determine if the target device(s) 530 is connected through an IO port, a universal adaptor or directly to the controller 500.

The method 600 is shown to include a step of identifying information related to one or more parameters such as firmware components (e.g., firmware binaries) associated with the target device(s) 530 (Step 606). In some embodiments, the information may be identified by the firmware scanner 514 (referred above in FIG. 5). The information may provide insights into firmware image and third-party binaries associated with the target device(s) 530.

The method 600 is shown to include a step of identifying information pertaining to one or more parameters such as a configuration deployed on the target device(s) 530 (Step 608). In some embodiments, the information may be identified by the configuration scanner 516 (referred above in FIG. 5) that may scan the configuration deployed on the target device(s) 530. In some embodiments, the configuration may indicate at least one of a device configuration i.e., internal configuration within the target device(s) 530 or tier 2/tier 3 configuration of one or more devices connected with the target device(s) 530.

The method 600 is shown to include a step of identifying information related to one or more parameters such as software components, alternatively referred as SDR (Software-defined radio) components of the target device(s) 530 (Step 610). In some embodiments, the information may be identified by the SDR scanner 518 (referred above in FIG. 5). One or more radio frequencies supported by the target device(s) 530 may be identified. For example, the SDR scanner 518 may determine if the target device(s) 530 supports Bluetooth, Zigbee or any other radio frequencies.

The method 600 is shown to include a step of determining network traffic of the target device(s) 530 (Step 612). In some embodiments, the network traffic may be determined by the network analyzer 519 (referred above in FIG. 5). The network analyzer 519 may be configured to monitor network traffic of the target device(s) 530. The network traffic may indicate incoming and/or outgoing traffic in a network pertaining to the target device(s) 530. For example, network traffic may indicate traffic or data packets generated or transmitted by the target device(s) 530 over the network. Additionally, network traffic may indicate data packets received by the target device(s) 530 from one or more external entities in the network.

The method 600 is shown to include a step of communicating with one or more servers to obtain data feeds and further analyzing information pertaining to one or more parameters based on the data feeds (Step 614). In some embodiments, the information pertaining to one or more parameters including, but not limited to, applications such as operating system, third-party libraries/shared libraries, firmware components etc. may be analyzed based on the data feeds by the data feed analyzer 520 (referred above in FIG. 5) to identify a threat associated with the one or more parameters. As referred above, the data feeds may include threat information associated with the plurality of parameters. Artificial intelligence and/or machine learning techniques may be utilized to analyze information pertaining to the one or more parameters based on the data feeds to identify the threat associated with the one or more parameters. In some other embodiments, the information pertaining to one or more parameters may be analyzed based on the data seeds stored in the database 526 to identify a threat associated with the one or more parameters.

The method 600 is shown to include a step of performing at least one test operation on the information pertaining to one or more parameters to obtain test data (Step 616). In some embodiments, the test operation may be performed on one or more parameters such as, but not limited to, hardware ports, communication protocols, software components, applications deployed on the target device(s) 530 etc. In some embodiments, the test operation may indicate one or more fuzzing operations that involve providing one or more invalid, random, or unexpected inputs into the target device(s) 530 to obtain test data. In some embodiments, the test operation may be performed by the fuzzing module 522 (referred above in FIG. 5) that may be configured to utilize one or more predefined test frameworks 534 stored in the database 526 to perform the test operation. The one or more predefined test frameworks 534 may be a set of guidelines or rules used for creating and performing the test operations. In some other embodiments, one or more test frameworks may be generated on-the-fly based on the information pertaining to the one or more parameters of the target device(s) 530. The test operation may be performed on the information pertaining to one or more parameters and an outcome of the test operation may be provided in the form of test data.

The method 600 is shown to include a step of determining cyber health score of the target device(s) 530 (Step 618). In some embodiments, the cyber health score may be determined by the modelling engine 524 (referred above in FIG. 5). The cyber health score may provide an indication of a probability of cyber-attacks that the target device(s) 530 may be subjected to. In some embodiments, the cyber health score is a plurality of cyber health scores for each device in the target devices. In some embodiments, the cyber health score is a system cyber health score based on one or more device cyber health scores. The system cyber health score can be proportional to, an average of, a minimum of, a maximum of, inverse to, or otherwise related to the one or more device cyber health scores. In some embodiments, at least one of the test data, network traffic, threat, firmware components, and configuration may be fed as one or more inputs to the modelling engine 524. Further, at least one of the test data, network traffic, threat, firmware components, and configuration may be analyzed by the modelling engine 524 using artificial intelligence techniques to determine the cyber health score of the target device(s) 530. In some embodiments, weightage may be assigned to each of the test data, network traffic, threat, firmware components, and configuration to determine the cyber health score. For example, if the target device(s) 530 is not connected to the network i.e., the target device(s) 530 is offline, a low weightage may be assigned to the network traffic while determining the cyber health score, since the incoming/outgoing network traffic pertaining to the target device(s) 530 is null.

In some embodiments, one or more alerts may be provided to the user interface 528, indicating the cyber health score of the target device(s) 530. The alerts in form of audio, visual, textual based alerts, or any combination thereof may be provided to a user via the user interface 528. For example, cyber health score of the target device(s) 530 may be compared with a predefined threshold and one or more alerts may be generated on the user interface 528 based on a deviation of the cyber health score from the predefined threshold. In some embodiments, the predefined threshold may be set by the controller 500. In some other embodiments, the predefined threshold may be set by the user via the user interface 528.

Figure 7:
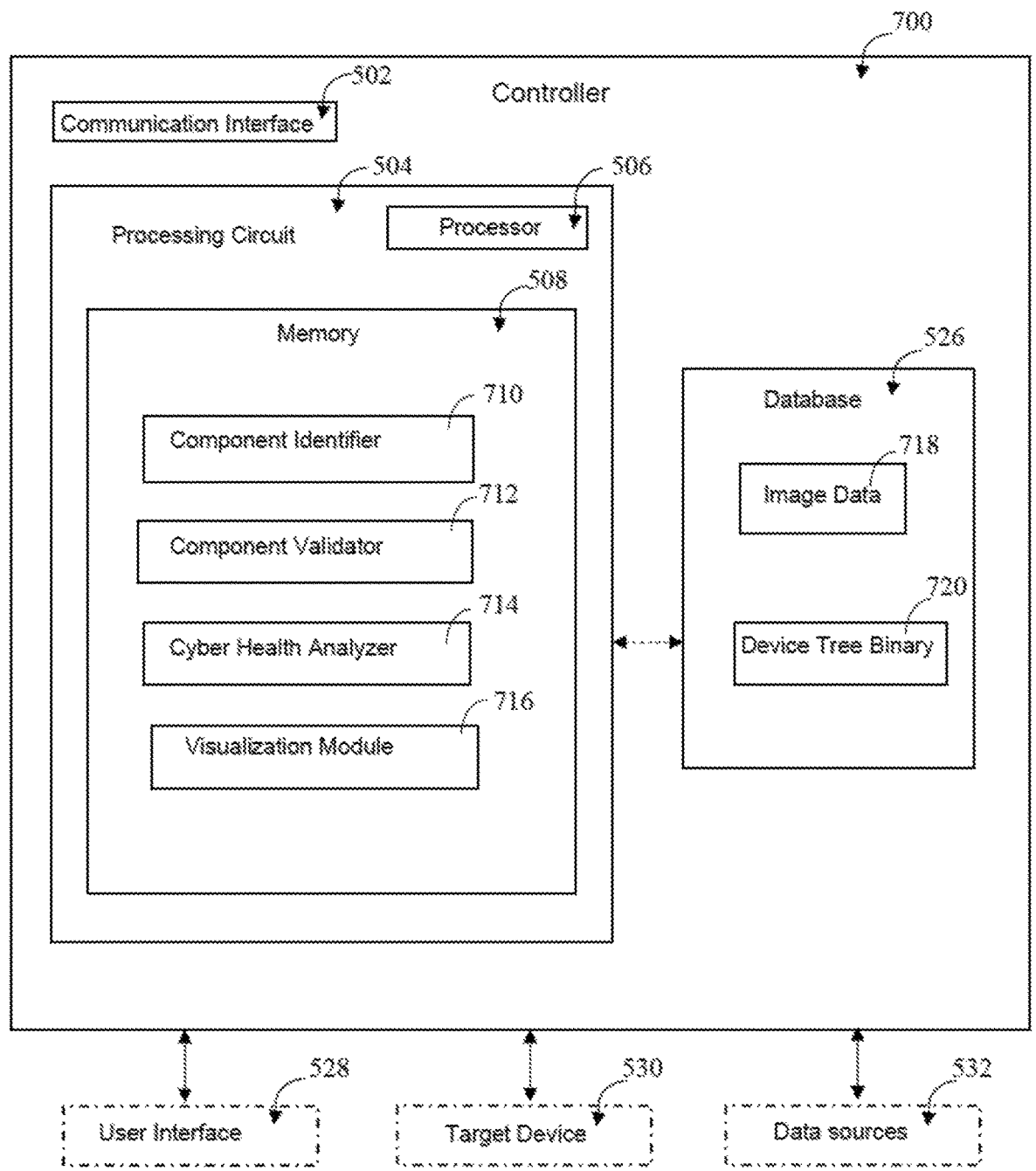
FIG. 7 is a block diagram of a controller that can be used in the BMS, according to some embodiments.

Referring now to FIG. 7, a block diagram illustrating a controller 700 is shown, according to some embodiments. Controller 700 can be a controller of the building management systems (BMS) described above with respect to FIGS. 1-4. Controller 700 is shown to include a communication interface 502, a processing circuit 504 and a database 526. Communication interface 502 may include wired or wireless interfaces (e.g., jacks, antennas, transmitters, receivers, transceivers, wire terminals, etc.) for conducting data communications with various systems, devices, or networks. For example, communication interface 502 may include an Ethernet card and port for sending and receiving data via an Ethernet-based communications network and/or a Wi-Fi transceiver for communicating via a wireless communications network. Communication interface 502 may be configured to communicate via local area networks or wide area networks (e.g., the Internet, a building WAN, etc.) and may use a variety of communication protocols (e.g., BACnet, IP, LON, etc.).

Communication interface 502 may be a network interface configured to facilitate electronic data communications between the controller 500 and various external systems or devices (e.g., one or more user interfaces 528). In some embodiments, the communication interface 502 can be the communication interface of the building management systems (BMS) described above with respect to FIGS. 1-4.

The processing circuit 504 is shown to include a processor 506 and a memory 508. In some embodiments, the processing circuit 504 can be the processing circuit of the building management systems (BMS) described above with respect to FIGS. 1-4. The processor 506 may be a general purpose or specific purpose processor, an application specific integrated circuit (ASIC), one or more field programmable gate arrays (FPGAs), a group of processing components, or other suitable processing components. The processor 506 may be configured to execute computer code or instructions stored in memory 508 or received from other computer readable media (e.g., CDROM, network storage, a remote server, etc.).

The memory 508 may include one or more devices (e.g., memory units, memory devices, storage devices, etc.) for storing data and/or computer code for completing and/or facilitating the various processes described in the present disclosure. The memory 508 may include random access memory (RAM), read-only memory (ROM), hard drive storage, temporary storage, non-volatile memory, flash memory, optical memory, or any other suitable memory for storing software objects and/or computer instructions. The memory 508 may include database components, object code components, script components, or any other type of information structure for supporting various activities and information structures described in the present disclosure. The memory 508 may be communicably connected to the processor 506 via the processing circuit 504 and may include computer code for executing (e.g., by processor 506) one or more processes described herein.

Still referring to FIG. 7, the controller 700 is shown to be in communication with the user interface 528, typically, via the communication interface 502. In some embodiments, the user interface 528 may be associated with an electronic device of a user. In some embodiments, the electronic device can be one of, but not limited to, mobile, smartphone, laptop, desktop, personal digital assistant (PDA), tablet, or any other electronic device with communication capabilities.

Still referring to FIG. 7, the controller 700 is shown to be in communication with one or more target device(s) 530, alternatively referred as building devices, via the communication interface 502. The target device(s) 530 may be one of the IoT enabled devices, i.e., edge devices of the BMS. In some embodiments, the target device(s) 530 may be one of the building subsystems 428 present in a BMS as disclosed in FIGS. 1-4. In some embodiments, the target device(s) 530 is a building system such as BMS 12. In some other embodiments, the target device(s) 530 is adapted to be connected with one or more peripheral devices such as the building subsystems 428.

Still referring to FIG. 7, the controller 700 is shown to include a database 526. In some embodiments, the database 526 may be located remote from the controller 700. The database 526 is shown to include image data 718. The controller 700 may communicate with the target device(s) 530 to obtain the image data 718. The image data 718 may comprise at least one of an image of a circuit board, or image of a schematic diagram of a circuit board of the target device(s) 530. Additionally, the controller 700 may be configured to obtain on-the-fly real-time images of the circuit board captured using a high-resolution camera. Such real-time images may also be stored in the database 526 as image data 718.

Further, the database 526 is shown to include a device tree binary (DTB) 720. In some embodiments, the device tree binary 720 may be a data structure describing one or more hardware components of building devices such as the target device(s) 530. The DTB 720 may be a run-time data structure that represents one or more peripheral devices, processors, and buses of building devices. The database 526 may also include a device tree source (DTS) that may be a human readable form of the DTB 720. A DTS can include several branches each representing a component of building devices such as, for example, the memory and buses from its root. Each branch may split further, for instance, to represent various peripherals connected to a particular bus, or for describing various pins within a GPIO (General Purpose Input-Output) peripheral.

Alternatively, in some embodiments, a secure golden copy of a device tree binary (DTB) may be stored on the prediction engine (not shown) stored remotely on a cloud. The controller 700 may communicate with the prediction engine to obtain information on the secure golden copy of the device tree binary.

In some embodiments, the controller 700 is in communication with the one or more data sources 532, alternatively referred as servers. In some embodiments, the data sources 532 may be one or more of third-party data sources, remote data sources, and on-premises data sources. For an example, the data sources 532 may include one or more remote data sources that may correspond to remote servers associated with open-source networks. In some embodiments, the controller 700 may be configured to obtain a plurality of data feeds from the data sources 532 that may be further stored in the database 526. In some embodiments, the data feeds may include threat information associated with a plurality of hardware components of building devices similar to target device(s) 530. Further, in some embodiments, the database 526 may be populated with a plurality of data seeds indicating an initial set of data that provide threat information associated with a plurality of hardware components of building devices.

Still referring to FIG. 7, the controller 700 is shown to include a component identifier 710. The component identifier 710 may utilize the image data 718 stored in the database 526. As referred above, the image data 718 may include at least one of an image of a circuit board, or image of a schematic diagram of a circuit board. In some embodiments, the circuit board may be of a building device such as the target device(s) 530. Further, the component identifier 710 may be configured to analyze the image data 718 to identify one or more components of the circuit board. In some embodiments, the component identifier 710 may be configured to analyze the image data 718 by using one or more image processing techniques to identify one or more components of the circuit board. For example, the component identifier 710 may utilize one or more AI (artificial intelligence) based tools to perform the image processing techniques. In some embodiments, the components may include one or more of, but not limited to, a memory, register, transistor, capacitor, pinout, transformer, sensor and the like. Further, the component identifier 710 may generate a layout for the identified components. The layout may include at least one of identification information, location information, and working information pertaining to the one or more components.

Generally, hardware implementation on a circuit board of a target device(s) 530 contains information about the components of the circuit board. However, in some cases, the components may be tagged with incorrect information while manufacturing of the circuit board. Thus, there is a need to correctly identify the components of the circuit board. The controller 700 includes a component validator 712 that may be configured to communicate with the component identifier 710 to receive the identified components. Further, the component validator 712 may validate the one or more components to ensure that the components are correctly identified. In some embodiments, the component validator 712 may be configured to utilize at least one of the device tree binary 720 stored in the database 526 or the secure golden copy of the device tree binary stored in the prediction engine. The component validator 712 may analyze the identified components with respect to the device tree binary 720 or the secure golden copy of the device tree binary to validate if the one or more components are correctly identified.

Further, the component validator 712 may generate one or more alerts on the user interface 528 indicating an outcome of validation of the one or more components. In some embodiments, the one or more alerts may be in form of text, graphics, audio, video etc., or any combination thereof. Alternatively, in some embodiments, an output of image processing performed on the image data 718 may be provided to the prediction engine for validating the identified components.

Still referring to FIG. 7, the controller 700 is shown to include a cyber health analyzer 714. The cyber health analyzer 714 may be configured to communicate with the component identifier 710 and the component validator 712. Further, the cyber health analyzer 714 may be configured to analyze the layout based on the data feeds provided by the data sources 532. For example, the cyber health analyzer 714 may analyze the data feeds to check if any attacks to similar components of the circuit board identified by the component identifier 710, were reported in the data feeds. Based on the analysis of the layout with the data feeds, the cyber health score of the one or more components of the circuit board may be determined. For example, cyber health analyzer 714 may analyze the data feeds to check if any attacks were reported for a component X of the circuit board.

In some embodiments, the cyber health analyzer 714 may be configured to utilize one or more artificial intelligence techniques to analyze the layout based on the data feeds to determine cyber health score of the components of the circuit board. In some other embodiments, the cyber health analyzer 714 may analyze the layout based on data seeds stored in the database 526 to determine a cyber health score of the components of the circuit board. Further, in some embodiments, a consolidated cyber health score of the circuit board may be generated by combining the cyber health score of the one or more components of the circuit board.

Still referring to FIG. 7, the controller 700 is shown to include a visualization module 716. The visualization module 716 may be configured to communicate with the cyber health analyzer 714 to receive information on cyber health score of the one or more components of the circuit board. In some embodiments, the visualization module 716 may provide one or more alerts to the user interface 528, indicating the cyber health score. For example, the visualization module 716 may compare the cyber health score with a predefined threshold and generate one or more alerts on the user interface 528 based on a deviation of the cyber health score from the predefined threshold. The alerts in form of audio, visual, textual based alerts, or any combination thereof may be provided to the user interface 528. In some embodiments, the predefined threshold may be set by the controller 700. In some other embodiments, the predefined threshold may be set by a user via the user interface 528.

Further, the visualization module 716 may be configured to create a 3D visualization of security assessment of the circuit board based on the cyber health score. The security assessment may show information such as one or more security threats or potential attack surface associated with the circuit board of the target device(s) 530 based on the cyber health score of the one or more components of the circuit board. In some embodiments, the visualization module 716 may be configured to provide the 3D visualization of the security assessment over the user interface 528. The 3D visualization of the security assessment may alert users of potential security threats in a designing phase of the circuit board of the target device(s) 530, thus allowing users to mitigate one or more security loopholes associated with the components of the circuit board. In some embodiments, the security assessment may be shown over the user interface 528 allowing users to browse a plurality of components of the circuit board, identify cyber health score of the components, and potential attack surface that may be developed on the target device(s) 530. In some embodiments, the visualization module 716 may be configured to provide one or more recommendations in the security assessment to design and implement circuit board of the target device(s) 530 in such a way as to mitigate the security loopholes associated with the components of the circuit board. In some embodiments, the visualization module 716 may generate one or more alerts for one or more corrective actions such as disabling one or more debug interfaces of the circuit board e.g., JTAG interfaces in order to improve the cyber health score.

Figure 8:
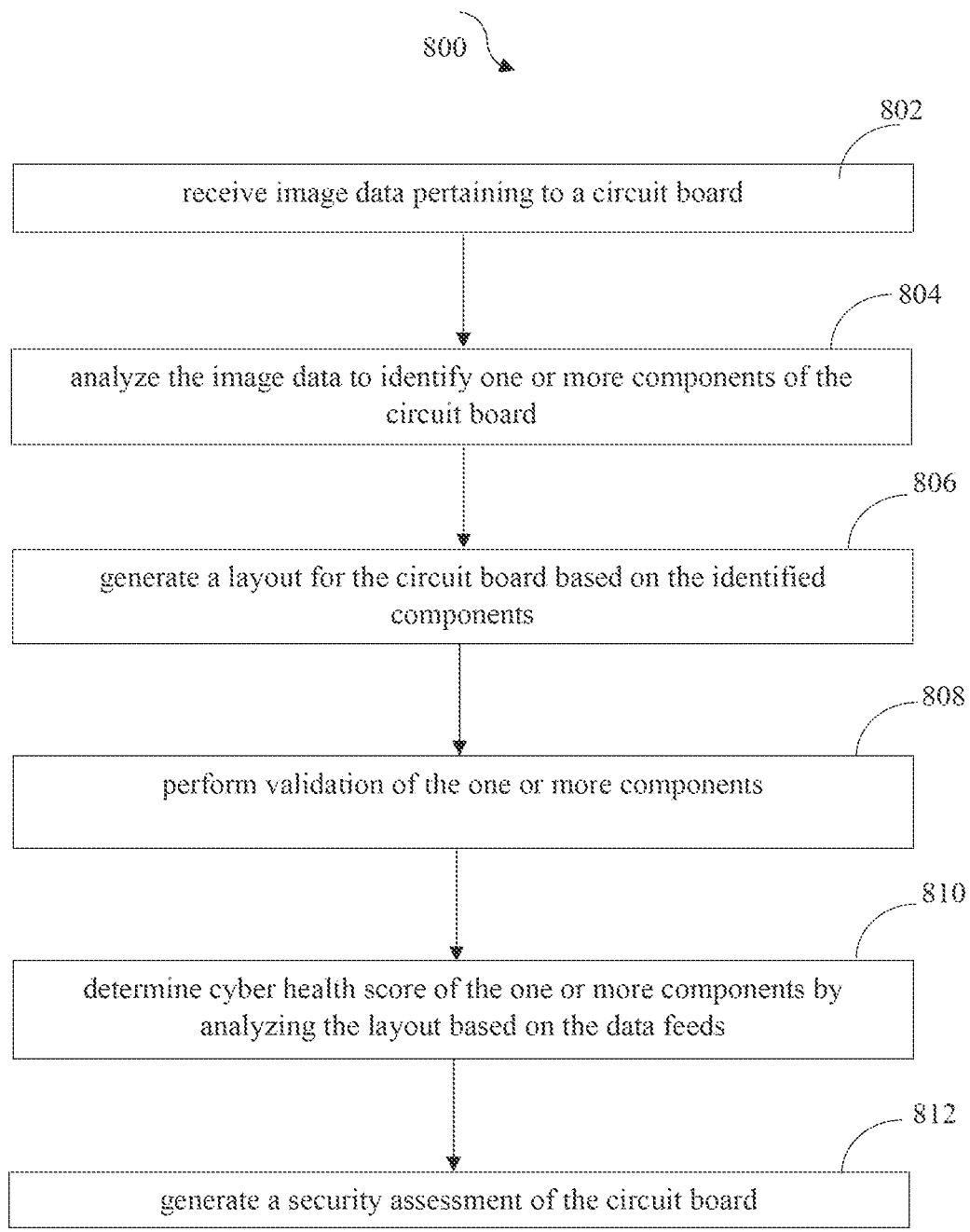
FIG. 8 is a flowchart of a method for determining cyber health score of hardware components of a circuit board, according to some embodiments.

Referring now to FIG. 8, a flow chart of a method 800 for determining cyber health score of hardware components of a circuit board is shown, according to some embodiments. The method 800 is performed by the controller 700 referred above in FIG. 7. Alternatively, the method 800 may be partially or completely performed by another computing system or controller of the BMS.

The method 800 is shown to include a step of receiving image data 718 pertaining to a circuit board (Step 802). As referred above, the image data 718 may include at least one of an image of a circuit board or an image of a schematic diagram of a circuit board pertaining to a building device such as the target device(s) 530 (referred above in FIG. 7). The image data 718 may be stored in the database 526. In some embodiments, on-the-fly real-time images of the circuit board may be captured using a high-resolution camera. Such real-time images may also be stored in the database 526 as image data 718.

The method 800 is shown to include a step of analyzing the image data 718 to identify one or more components of the circuit board (Step 804). In some embodiments, the image data 718 may be analyzed by the component identifier 710 (referred above in FIG. 7). In some embodiments, the image data 718 may be analyzed by using one or more image processing techniques to identify one or more components of the circuit board. For example, one or more AI based tools may be utilized to perform the image processing techniques. In some embodiments, the components may include, but not limited to, one or more of a memory, register, transistor, capacitor, pinout, transformer, sensor and the like.

The method 800 is shown to include a step of generating a layout of the circuit board, the layout having the identified components of the circuit board (Step 806). In some embodiments, the layout of the circuit board may be generated by the component identifier 710. The layout may include at least one of identification information, location information, and working information pertaining to the one or more components of the circuit board.

The method 800 is shown to include a step of performing validation of the one or more identified components (Step 808). In some embodiments, the one or more identified components may be validated by the component validator 712 (referred above in FIG. 7). Generally, hardware implementation on a circuit board of a target device(s) 530 contains information about the components of the circuit board. However, in some cases, the components may be tagged with incorrect information while manufacturing of the circuit board. Thus, there is a need to correctly identify the components of the circuit board. The component validator 712 may validate the components to ensure that the components are correctly identified. In some embodiments, at least one of the device tree binary 720 stored in the database 526 or the secure golden copy of the device tree binary stored in the prediction engine may be utilized to validate the one or more components. The one or more components identified by the component identifier 710 may be analyzed with respect to the device tree binary 720 or the secure golden copy of the device tree binary to validate correct identification of the components.

In some embodiments, one or more alerts may be generated on the user interface 528 indicating an outcome of validation of the one or more components. In some embodiments, the one or more alerts may be in form of text, graphics, audio, video etc., or any combination thereof. Alternatively, in some embodiments, an output of image processing performed on the image data 718 may be provided to the prediction engine for validating the identified components.

The method 800 is shown to include a step of determining cyber health score of the one or more components (Step 810). In some embodiments, the cyber health score of the one or more components may be determined by the cyber health analyzer 714 (referred above in FIG. 7). The layout pertaining to the circuit board may be analyzed based on the data feeds provided by the data sources 532 to determine the cyber health score of the one or more components of the circuit board. For example, the cyber health analyzer 714 may analyze the data feeds to check if any attacks to similar components of the circuit board identified by the component identifier 710, were reported in the data feeds. For example, the cyber health analyzer 714 may analyze the data feeds to check if any attacks were reported for a component X of the circuit board.

In some embodiments, one or more artificial intelligence techniques may be utilized to analyze the layout based on the data feeds to determine the cyber health score of the components. In some other embodiments, the cyber health analyzer 714 may analyze the layout based on data seeds stored in the database 526 to determine cyber health score of the components of the circuit board. Further, in some embodiments, a consolidated cyber health score of the circuit board may be generated by combining the cyber health score of the one or more components of the circuit board.

The method 800 is shown to include a step of generating a security assessment of the circuit board (Step 812). In some embodiments, one or more alerts may be provided to the user interface 528 indicating the cyber health score. For example, the cyber health score may be compared with a predefined threshold to generate one or more alerts on the user interface 528 based on a deviation of the cyber health score from the predefined threshold. The alerts in form of audio, visual, textual based alerts, or any combination thereof may be provided to the user interface 528. In some embodiments, the predefined threshold may be set by the controller 700. In some other embodiments, the predefined threshold may be set by a user via the user interface 528.

In some embodiments, a 3D visualization of the security assessment of the circuit board may be generated by the visualization module 716 (referred above in FIG. 7). The security assessment may show information such as one or more security threats or potential attack surface associated with the target device(s) 530 based on the cyber health score of the one or more components of the circuit board. In some embodiments, the 3D visualization of the security assessment may be provided over the user interface 528. The 3D visualization of the security assessment may alert users of potential security threats in a designing phase of the circuit board of the target device(s) 530, thus allowing users to mitigate one or more security loopholes associated with the circuit board of the target device(s) 530. In some embodiments, the security assessment may be shown over the user interface 528 allowing users to browse a plurality of components of the circuit board, identify cyber health score of the plurality of components, and potential attack surface that may be developed on the target device(s) 530. In some embodiments, the security assessment may include one or more recommendations to design and implement circuit board of target device(s) 530 in such a way as to mitigate the security loopholes associated with the components of the target device(s) 530. In some embodiments, one or more alerts may be generated for one or more corrective actions such as disabling one or more debug interfaces e.g., JTAG interfaces of the circuit board in order to improve the cyber health score.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS), comprising:
   one or more processors; and
   one or more non-transitory computer-readable media storing instructions that, when executed by the one or more processors, cause the one or more processors to perform operations comprising:
   communicating with a target system comprising a plurality of target devices to identify information pertaining to parameters of the plurality of target devices;
   analyzing the information based on data feeds to identify a threat associated with at least one of the parameters;
   performing at least one test operation on the information to obtain test data;
   determining at least one of network traffic of at least one of the plurality of target devices, one or more firmware components of at least one of the plurality of target devices, or a configuration deployed on at least one of the plurality of target devices; and determining a system cyber health score of the target system based on device cyber health scores for the plurality of target devices, wherein the system cyber health score is based on the least one of the test data, network traffic, threat, firmware components, or configuration.

2. The BMS of claim 1, wherein the data feeds contain threat information associated with at least one of the parameters.

3. The BMS of claim 1, wherein the parameters include at least one of hardware ports, communication protocols, software-defined radio components, firmware components, third-party libraries, applications, or configurations of the plurality of target devices.

4. The BMS of claim 1, wherein the operations further comprises determining the network traffic of at least one of the plurality of target devices, the one or more firmware components of at least one of the plurality of target devices, and the configuration deployed on at least one of the plurality of target devices.

5. The BMS of claim 1, wherein the system cyber health score is based on an average of the device cyber health scores.

6. The BMS of claim 1, wherein the system cyber health score is based on a minimum of the device cyber health scores.

7. The BMS of claim 1, wherein the test operation comprises one or more fuzzing operations to generate the test data.

8. A building management system (BMS), comprising:
one or more processors; and
one or more non-transitory computer-readable media storing instructions that, when executed by the one or more processors, cause the one or more processors to perform operations comprising:
communicating with a target device to identify information pertaining to at least one of a plurality of parameters;
communicating with one or more servers to obtain data feeds, wherein the information pertaining to the at least one of the plurality of parameters is analyzed based on the data feeds to identify a threat associated with the one or more parameters;
performing at least one test operation on the information pertaining to one or more parameters to obtain test data;
determining network traffic of the target device;
determine one or more firmware components of the target device;
determine configuration deployed on the target device; and
determine a cyber health score of the target device based on at least one of the test data, network traffic, threat, firmware components, and configuration.

9. The system of claim 8, wherein the plurality of parameters is selected from a group consisting of hardware ports, communication protocols, software-defined radio components, firmware components, third-party libraries, applications, and configuration.

10. The system of claim 8, wherein the operations further comprise communicating with the target device using one of a plurality of communication protocols selected from a group consisting of BACnet, Modbus, MQTT (Message Queueing Telemetry Transport), Lora WAN, Zigbee, Z-wave, UART (Universal Asynchronous Receiver-Transmitter), JTAG (Joint Test Action Group), SPI (Serial Peripheral Interface), I2C (Inter-Integrated Circuit).

11. The system of claim 8, further comprising a modelling engine that utilizes artificial intelligence techniques to analyze at least one of the test data, network traffic, threat, firmware components, and configuration to determine cyber heath score of the target device.

12. The system of claim 8, wherein the operations further comprise generating one or more alerts indicating the cyber health score.

13. A method, comprising:
communicating with a target system comprising a plurality of target devices to identify information pertaining to parameters of the plurality of target devices;
analyzing the information based on data feeds to identify a threat associated with at least one of the parameters;
performing at least one test operation on the information to obtain test data;
determining at least one of network traffic of at least one of the plurality of target devices, one or more firmware components of at least one of the plurality of target devices, or a configuration deployed on at least one of the plurality of target devices; and
determining a system cyber health score of the target system based on device cyber health scores for the plurality of target devices, wherein the system cyber health score is based on the least one of the test data, network traffic, threat, firmware components, or configuration.

14. The method of claim 13, wherein the data feeds contain threat information associated with at least one of the parameters.

15. The method of claim 13, wherein the parameters include at least one of hardware ports, communication protocols, software-defined radio components, firmware components, third-party libraries, applications, or configurations of the plurality of target devices.

16. The method of claim 13, further comprising determining the network traffic of at least one of the plurality of target devices, the one or more firmware components of at least one of the plurality of target devices, and the configuration deployed on at least one of the plurality of target devices.

17. The method of claim 13, wherein the system cyber health score is based on an average of the device cyber health scores.

18. The method of claim 13, wherein the system cyber health score is based on a minimum of the device cyber health scores.

19. The method of claim 13, wherein the test operation comprises one or more fuzzing operations to generate the test data.

20. The method of claim 13, further comprising generating one or more alerts indicating the system cyber health score.

* * * * *